United States Patent
Gallagher et al.

[11] Patent Number: 5,902,428
[45] Date of Patent: May 11, 1999

[54] MOTOR VEHICLE INSTRUMENT PANEL WITH FLEXIBLE TETHERING HINGED AIR BAG DEPLOYMENT DOOR

[75] Inventors: Michael J. Gallagher, Hampton; Peter J. Iannazzi, Hampstead, both of N.H.

[73] Assignee: Davidson Textron Inc., Troy, Mich.

[21] Appl. No.: 09/120,510

[22] Filed: Jul. 22, 1998

Related U.S. Application Data

[60] Continuation of application No. 08/890,857, Jul. 10, 1997, which is a division of application No. 08/540,471, Oct. 10, 1995, Pat. No. 5,685,930, which is a continuation-in-part of application No. 08/414,387, Mar. 31, 1995, Pat. No. 5,564,731.

[51] Int. Cl.⁶ .................................................. B29C 65/02
[52] U.S. Cl. .................. 156/73.1; 156/73.5; 156/272.2; 156/290; 156/308.4; 264/68; 264/445
[58] Field of Search ................................. 156/73.1, 73.5, 156/272.2, 290, 308.2, 308.4; 264/442, 443, 445, 68

[56] References Cited

U.S. PATENT DOCUMENTS

| | | | |
|---|---|---|---|
| 4,893,833 | 1/1990 | DiSalvo et al. | 280/732 |
| 5,158,322 | 10/1992 | Sun | 280/732 |
| 5,316,822 | 5/1994 | Nishijima et al. | 428/138 |
| 5,348,339 | 9/1994 | Turner | 280/728 B |
| 5,536,351 | 7/1996 | Rheinlander et al. | 156/212 |
| 5,564,731 | 10/1996 | Gallagher et al. | 280/728.3 |
| 5,580,083 | 12/1996 | Parker | 280/728.3 |
| 5,685,930 | 11/1997 | Gallagher et al. | 156/73.1 |
| 5,783,016 | 7/1998 | Gallagher et al. | 156/214 |

*Primary Examiner*—James Sells
*Attorney, Agent, or Firm*—Reising, Ethington, Barnes, Kisselle, Learman & McCulloch, P.C.

[57] ABSTRACT

A molded motor vehicle instrument panel made of a thermoplastic material has an integral air bag deployment door for a passenger side air bag that is defined by a tear seam and is normally retained by an integral flexible mounting/hinge flange to a part of the vehicle structure when the seam is torn by the inflating air bag and wherein this flange then bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange because of plastic embrittlement at these low temperatures and the high bending stresses encountered at this juncture. This separation of the broken door portion from the vehicle structure is prevented by a tethering hinge that is formed of a strong flexible sheet material that spans this critical juncture between the mounting/hinge flange and door and remains flexible at these very cold temperatures to retain the broken door portion to the vehicle structure.

11 Claims, 4 Drawing Sheets

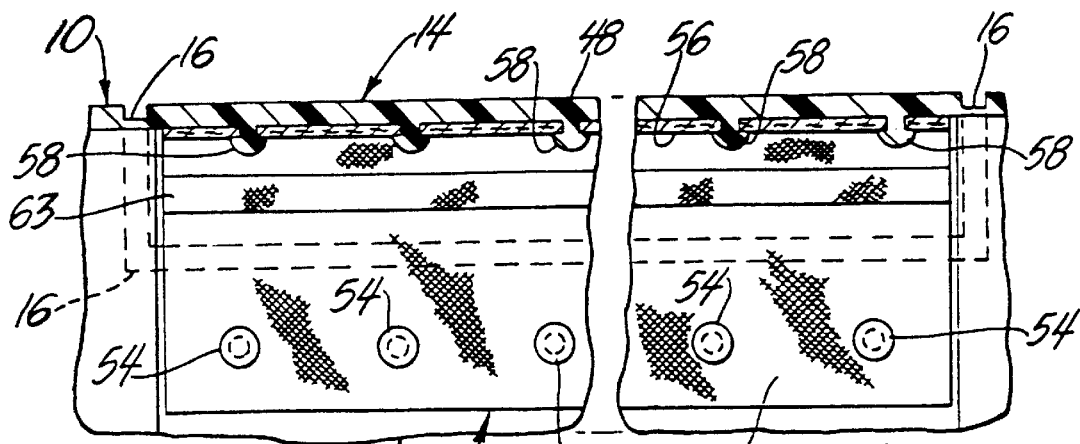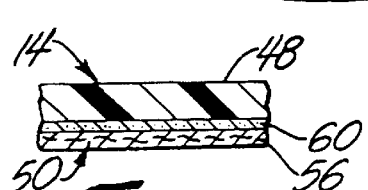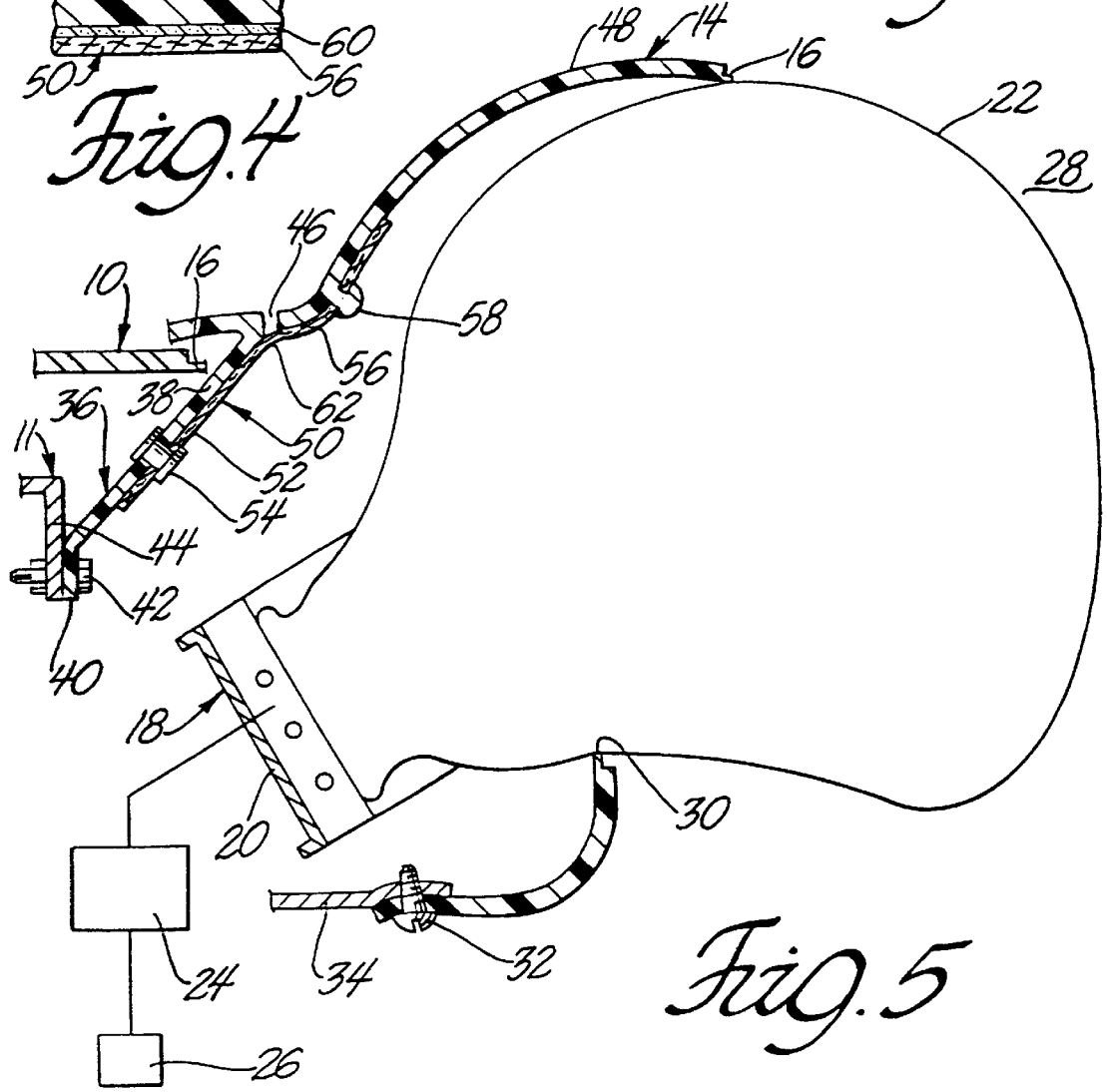

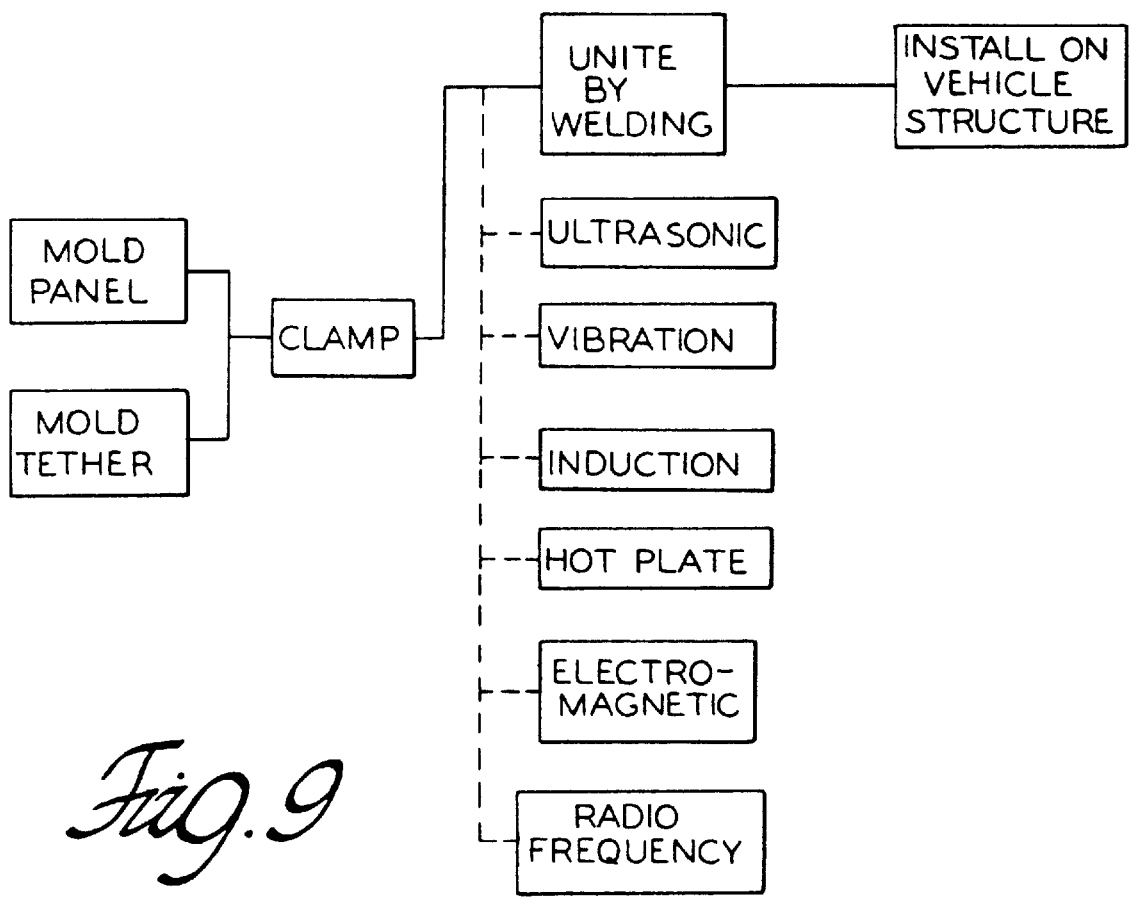
Fig. 9
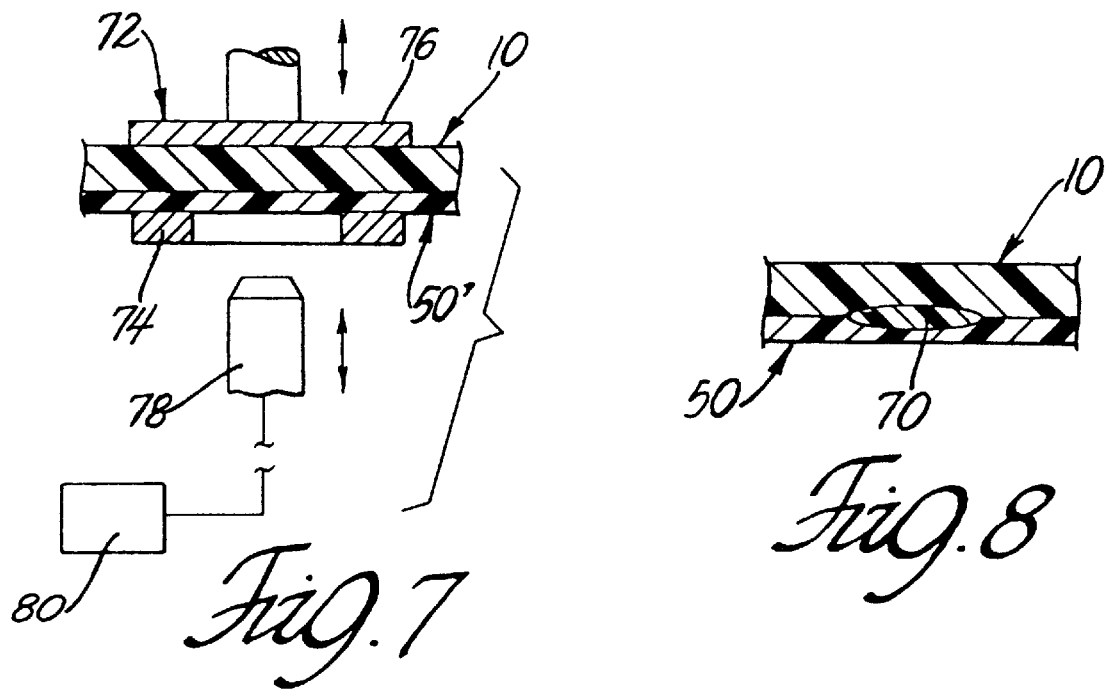
Fig. 7
Fig. 8

MOTOR VEHICLE INSTRUMENT PANEL WITH FLEXIBLE TETHERING HINGED AIR BAG DEPLOYMENT DOOR

This a continuation of U.S. Ser. No. 08/890,857 filed Jul. 10, 1997 which is a divisional of U.S. Ser. No. 08/540,471 filed Oct. 10, 1995 U.S. Pat. No. 5,685,930 which is a CIP of U.S. Ser. No. 08/414,387 filed Mar. 31, 1995 U.S. Pat. No. 5,564,731; all of which are incorporated by reference.

TECHNICAL FIELD

This invention relates to motor vehicle instrument panels having an integral air bag deployment door defined by a tear seam and more particularly to a tether for the air bag door when it is separated at very low temperatures from the instrument panel and then from a flexible hinge that is integral with the door and normally provides for opening swinging movement of the door and its retention to the vehicle structure at higher temperatures.

BACKGROUND OF THE INVENTION

Presently, most passenger-side air bag doors are formed in an air bag cover that is separate from the instrument panel because the latter is made of a commercially available thermoplastic material particularly suited to meeting the requirements of its application but is not well suited to meeting the requirements of an air bag door that is defined by a tear seam formed in the instrument panel. For example, the plastics materials used to make a self-supporting instrument panel must have a certain degree of stiffness and high heat resistance to meet the requirements of its application but the materials that are currently available for such an instrument panel do not retain ductility and become embrittled at very low or cold temperatures which is unsuitable for air bag deployment where the air bag door is formed integral with and defined by a tear seam formed in the instrument panel. Styrene-maleic anhydride, polypropylene, polycarbonate and polyphenylene oxide are examples of thermoplastic materials that are suitable for the instrument panel but do not have the required ductility or flexibility for such an air bag door at very low temperatures. As a result, the air bag cover or door on the passenger side is normally made separate from the instrument panel and of a different commercially available thermoplastic material such as polyurethane elastomer, polyester elastomer, and polyolefin elastomer which are suitable for such application but are not suitable for the requirements of the instrument panel.

Costs can be reduced, quality can be improved and styling can be enhanced by molding the instrument panel and the air bag cover including an integral air bag deployment door in one piece at the same time out of the same commercially available material provided, however, that the normal material requirements for the instrument panel are not sacrificed and the safe assured operability of the integral air bag deployment door is retained at reasonable cost, even though the plastics material may not be well suited thereto.

SUMMARY OF THE PRESENT INVENTION

A molded instrument panel made of a commercially available thermoplastic material well suited for the primary purpose of such a panel has an integral air bag deployment door for a passenger side air bag that is safely retained to the vehicle structure in a very cost effective manner. The air bag door is defined by a frangible tear seam in the panel and is normally retained by an integral flexible mounting/hinge flange to a part of the vehicle structure when the seam is torn by the inflating air bag and wherein this flange which before was integral with both the door and the panel is then separated from the panel while remaining integral with the door and bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange where it joins therewith because of plastic embrittlement at these low temperatures and the high bending stresses encountered at this juncture. This separation of the broken door portion from the vehicle structure is prevented by provision of a flexible tethering hinge that is formed separately from the panel of a different material and thereafter fastened to the panel so as to span the critical juncture between the flange and the potential break away door portion. The tethering hinge material is of a strong flexible material that remains flexible or ductile to a significant degree at these very cold temperatures.

The flexible tethering hinge is fastened along one margin on one side of the critical juncture zone to a portion of the mounting/hinge flange remote from this potential fracture zone by fastening means such as rivets and is fastened along another margin on the other side of this zone to the inner side of the potential break away door portion by fastening means such as an adhesive or heat staked bosses that can not be observed at the outer side of the door. The tethering hinge has a portion intermediate its margins that spans the potential fracture zone and flexes when door breakage occurs to permit the broken door portion to continue to swing outward to provide for air bag deployment while retaining the broken door portion to the vehicle structure.

According to another embodiment of the invention, the tethering hinge is formed of a second plastics material that is relatively more flexible than the first plastics material of the panel at temperatures below that which the first plastics material becomes unacceptably brittle and susceptible to breakage. In this embodiment, the tethering hinge is welded to the panel by selective application of energy.

It is therefore an object of the present invention to provide a new and improved motor vehicle instrument panel with an integral and tethered air bag deployment door and a method of forming such a panel.

Another object is to provide a new and improved motor vehicle instrument panel with an integral and tethered air bag deployment door at low cost and of high quality and to meet certain styling desires.

Another object is to provide a motor vehicle instrument panel having an integral air bag deployment door that is defined by a tear seam in the panel and is retained to the vehicle structure by a flexible tethering hinge in the event the door is separated at very low temperatures from an integral mounting/hinge flange that normally fastens the air bag door to the vehicle structure.

Another object is to provide a motor vehicle instrument panel including an air bag deployment door that is defined by a tear seam in the panel and is retained to the vehicle structure by a flexible tethering hinge formed of flexible sheet material in the event the door is separated at very low temperatures from an integral mounting/hinge flange that normally fastens the air bag door to the vehicle structure.

Another object is to provide a low cost, high quality, motor vehicle instrument panel including an integral and also flexibly tethered air bag deployment door wherein the door is defined by a tear seam in the panel and is retained to the vehicle structure by a flexible tethering hinge formed of flexible sheet material in the event the door is separated at very low temperatures because of cold embrittlement and bending stresses from an integral mounting/hinge flange that normally retains the air bag door to the vehicle structure.

These and other objects, advantages and features of the present invention will become more apparent from the following description and the accompanying drawings wherein:

BRIEF DESCRIPTION OF THE DRAWINGS

FIG. 3 is a view taken along the line 3—3 in FIG. 2 when looking in the direction of the arrows;

FIG. 4 is a view like FIG. 3 but of a much smaller cross section area in larger relative scale and illustrates in an exaggerated manner an adhesive used to fasten the flexible tethering hinge to the air bag door instead of the hot staked rivets shown in FIGS. 2 and 3;

FIG. 5 is a view like FIG. 2 but showing the air bag door opened and broken but retained during the deployment of the air bag at a very low temperature;

FIG. 7 is a schematic fragmentary cross-sectional view of the panel and tethering hinge layers held by a clamping fixture in preparation for subsequent welding according to another embodiment of the invention;

FIG. 8 is a schematic fragmentary cross-sectional view of the panel and tethering hinge layers of FIG. 7 shown joined by a weld; and FIG. 9 is a diagrammatic view showing the process steps for forming, joining together and installing the panel and tethering hinge layers to the vehicle structure in position over the air bag system.

DETAILED DESCRIPTION OF THE DRAWINGS

Figure 1:
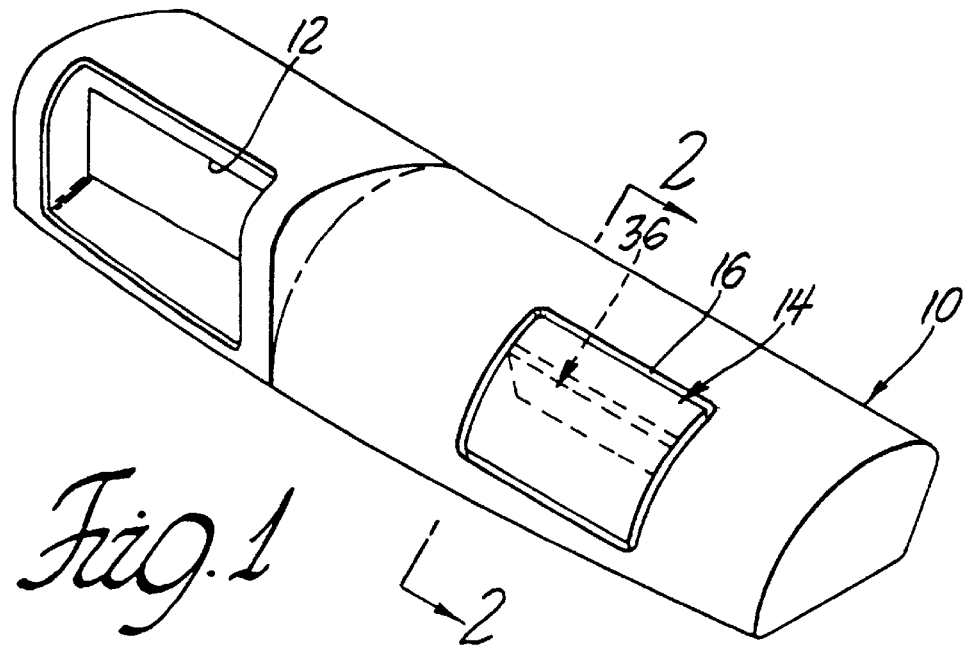
FIG. 1 is a perspective view of a motor vehicle instrument panel including integral air bag deployment door with a flexible tethering hinge according to the present invention and as installed in a motor vehicle over an air bag system.
Figure 2:
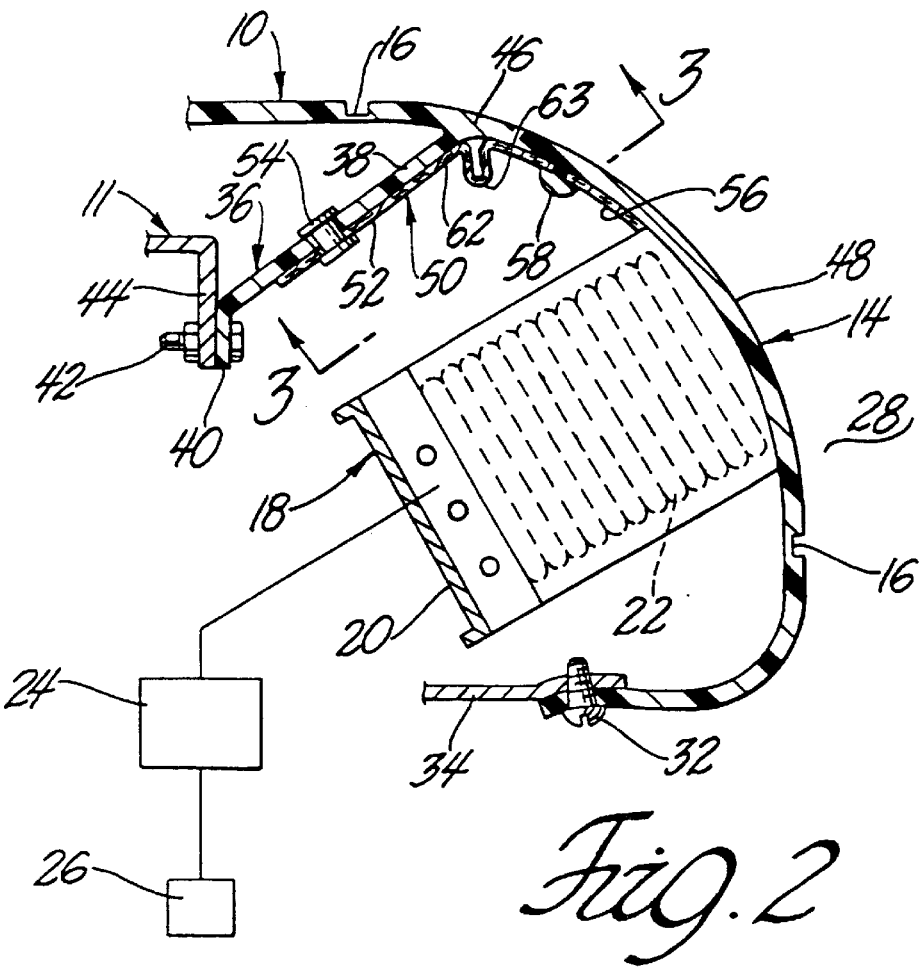
FIG. 2 is an enlarged view taken along the line 2—2 in FIG. 1 when looking in the direction of the arrows and includes a diagrammatic view of the air bag system.

Referring to FIGS. 1 and 2, there is illustrated a molded motor vehicle instrument panel 10 as installed in a motor vehicle structure generally designated as 11. The instrument panel 10 has an opening 12 on the driver side for the installation of an instrument cluster (not shown) and an air bag deployment door 14 of desired shape, in this case rectangular, on the passenger side whose entire or partial perimeter, in this case entire, is defined by a frangible tear seam 16 molded in the instrument panel. The tear seam 16 may be formed by a groove either in the face of the panel as shown or by a similar groove in the back side of the panel to hide the tear seam from view as is well known in the art or by other methods known to the art of forming an integral but frangible tear seam. When installed on the vehicle structure 11, the instrument panel covers an air bag system 18 that is located behind the instrument panel directly behind the air bag door 14 and is mounted on a sheet metal portion 20 of the vehicle structure. The air bag system 18 is of a conventional type that includes an inflatable air bag 22, an inflator 24 and an impact sensor 26 that on vehicle impact triggers ignition of the inflator to inflate the air bag for deployment into the passenger space 28 directly in front of a passenger seated on this side.

The instrument panel 10 is an injection molded one-piece part of generally uniform wall thickness and is formed of a first plastics material and preferably a suitable commercially available thermoplastic material such as polypropylene, polycarbonate, and styrene maleic anhydride that provides sufficient stiffness so that the panel is self-supporting to maintain the desired shape and has sufficient heat resistance to resist deformation due to heat in its interior vehicle environment where it is located immediately behind the windshield (not shown). The groove forming the tear seam 16 is made deep enough in relation to the wall thickness of the instrument panel and the strength of the plastic material so as to sufficiently weaken the wall section at the tear seam to the point that it is torn by the force of the inflating air bag acting against the back side of the air bag door and creates on its separation from the instrument panel an opening 30 therein for the deployment of the air bag as illustrated in FIG. 5 and described in more detail later.

The instrument panel 10 is fastened to portions of the vehicle structure 11 at various locations outside the area of the air bag door with one such location being shown in FIG. 2 wherein a sheet metal screw 32 fastens the panel at a lower edge thereof beneath the air bag door to a sheet metal portion 34 of the vehicle structure. And it will be understood that similar screws or other conventional type fasteners are used at other locations outside the area of the air bag door to securely fasten the instrument panel in place on the vehicle structure.

The air bag door 14 in the instrument panel 10 is separately fastened to the vehicle structure by an elongated mounting/hinge flange 36 that is molded integral with the back side of the door and extends horizontally along substantially the entire length and adjacent to the upper edge thereof as seen in FIGS. 1–3. The flange 36 has a flat portion 38 that extends transversely inwardly of the door a substantial distance and terminates in a flat, angled, horizontally extending, distal portion 40 that is fastened along its length by bolts 42 to a sheet metal portion 44 of the vehicle structure. The flange 36 is also formed with a uniform thickness and acts as a cantilever hinge to normally provide for outward swinging opening movement of the door when the door is separated along the tear seam from the instrument panel for air bag deployment. Prior to such air bag door separation, the flange 36 acts to fasten the instrument panel to the vehicle structure at the air bag door and also provides support for the latter against a pushing force such as from a passenger which could otherwise push the door inward and separate the door from the instrument panel along the tear seam.

The flange 36 is designed to normally hinge and retain the air bag door 14 to the vehicle structure during its outward opening movement when the tear seam 16 is torn by the force of the inflating air bag and as such serves as a primary tether for the door 14 to retain connection with the vehicle structure 11. In doing so, the flange 36 is highly stressed at its juncture 46 with the back side of the door as a portion 38 of the flange bends to effect swinging movement of the door. The material of the panel 10 and hence the flange 36 is flexible in a limited temperature range encompassing normal operating temperatures for most vehicle applications (e.g. 0° F. and above). However, at very low or cold temperatures such as −20 degrees Fahrenheit and below, the typical commercially available plastics material suitable for the instrument panel in its primary application can become brittle to the point where the lower and major portion 48 of the door that is forced by the inflating air bag to bend outward about the horizontally extending juncture 46 of the door with the flange portion 38 may fracture or break off at this highly stressed zone (see FIG. 5) and be flung into the passenger compartment. This is prevented in a very cost effective manner by the strategic addition of an elongated flexible supplemental tethering hinge 50 that is formed from a sheet of strong flexible material that is efficient and relatively more flexible or ductile than the plastics material of the panel 10 at temperatures substantially below that at which the material of the instrument panel 10 becomes brittle so as to tether the door in the event the highly stressed zone 46 fractures due to embrittlement of the panel material. Examples of such material for the hinge 50 are thermoplastic materials such as polyvinyl chloride, coated nylon and Kevlar, thermosetting materials such as polyurethane and polyester, metal mesh screen, and a woven fabric of fibers formed of such plastic materials or natural fibers such as cotton or hemp.

According to the embodiment of FIGS. 1–5, the flexible tethering hinge 50 extends horizontally substantially the entire length of the mounting/hinge flange 36 (see FIG. 3) and is fastened along one horizontal margin 52 of the hinge 50 on one side of the critical juncture zone 46 to the flat portion 38 of the mounting/hinge flange at a location remote from this potential fracture zone by fastening means such as rivets 54. The tethering hinge 50 is fastened along another horizontal margin 56 parallel to the margin 52 and on the other side of this potential fracture zone to the inner side of the potentially frangible air bag door portion 48 by fastening means that can not be observed at the outer side of the door. For example, the latter fastening means can be hot staked bosses 58 that are provided on the inner side of the door as shown in FIGS. 2, 3 and 5 such as by being molded integral therewith or friction welded thereto or the hidden fastening means may be a suitable adhesive 60 as shown in FIG. 4. Examples of suitable adhesives for this purpose are polyurethanes and polyolefins. In the case of where rivets and bosses are used to fasten the tethering hinge at both its margins 52 and 56 respectively and where a woven fabric as above described is employed as the tethering hinge, both of the margins 52 and 56 preferably comprise one or more folds to provide increased strength at their points of attachment to the mounting/hinge flange 36 and the potential break away door portion 48. Where an adhesive is used to fasten the woven fabric tethering hinge to the door, only the margin 52 is preferably provided with one or more folds to reinforce its attachment by the rivets 54 or other suitable mechanical fasteners to the mounting/hinge flange 36.

The tethering hinge 50 has a portion 62 intermediate its margins 52 and 56 that spans the potential fracture zone 46 and flexes when door breakage occurs as illustrated in FIG. 5 to permit the broken door portion 48 to continue to swing outward to provide for air bag deployment while retaining the broken door portion to the vehicle structure. The intermediate portion 62 of the flexible tethering hinge 50 is preferably provided with an outward fold 63 in its installed condition as shown in FIG. 2 that unfolds as shown in FIG. 5 on the fracturing off of the door portion 48 from the mounting/hinge flange 36 to minimize the amount of stretching that is required of the tethering hinge between it attaching means 54 and 58 or 60 to allow deployment of the air bag while retaining the broken door portion to the vehicle structure.

According to another embodiment of the invention, illustrated in FIGS. 6–9, the supplemental tethering hinge 50' is molded or otherwise formed separately from the panel 10 from a second plastics material that is different from the plastics material used for the panel. The construction of the panel 10, the vehicle support structure 11, and air bag system 18 may be the same as that described above for the first embodiment of FIGS. 1–5, and hence the same reference numerals will be used for those components.

The second plastics material for the supplemental tether hinge 50' is one that exhibits relatively greater flexibility or ductility than the material used for the panel 10 at temperatures below that which the plastics panel material becomes unacceptably brittle. Suitable plastics materials for the supplemental tethering hinge 50' include polyolefin elastomer, polyurethane elastomer, polyester elastomer, silicone or rubber modified plastic; however, the means and method by which the hinge 50' is attached to the panel is different than that described previously for the first embodiment.

As illustrated diagrammatically in FIG. 9, the panel 10 and tethering hinge 50' are formed separately from one another (e.g., molded from the aforementioned first and second plastics materials, respectively) and are subsequently brought together and joined in a subsequent welding operation by means of which the panel 10 and tethering hinge 50' become permanently fused to one another.

Figure 6:
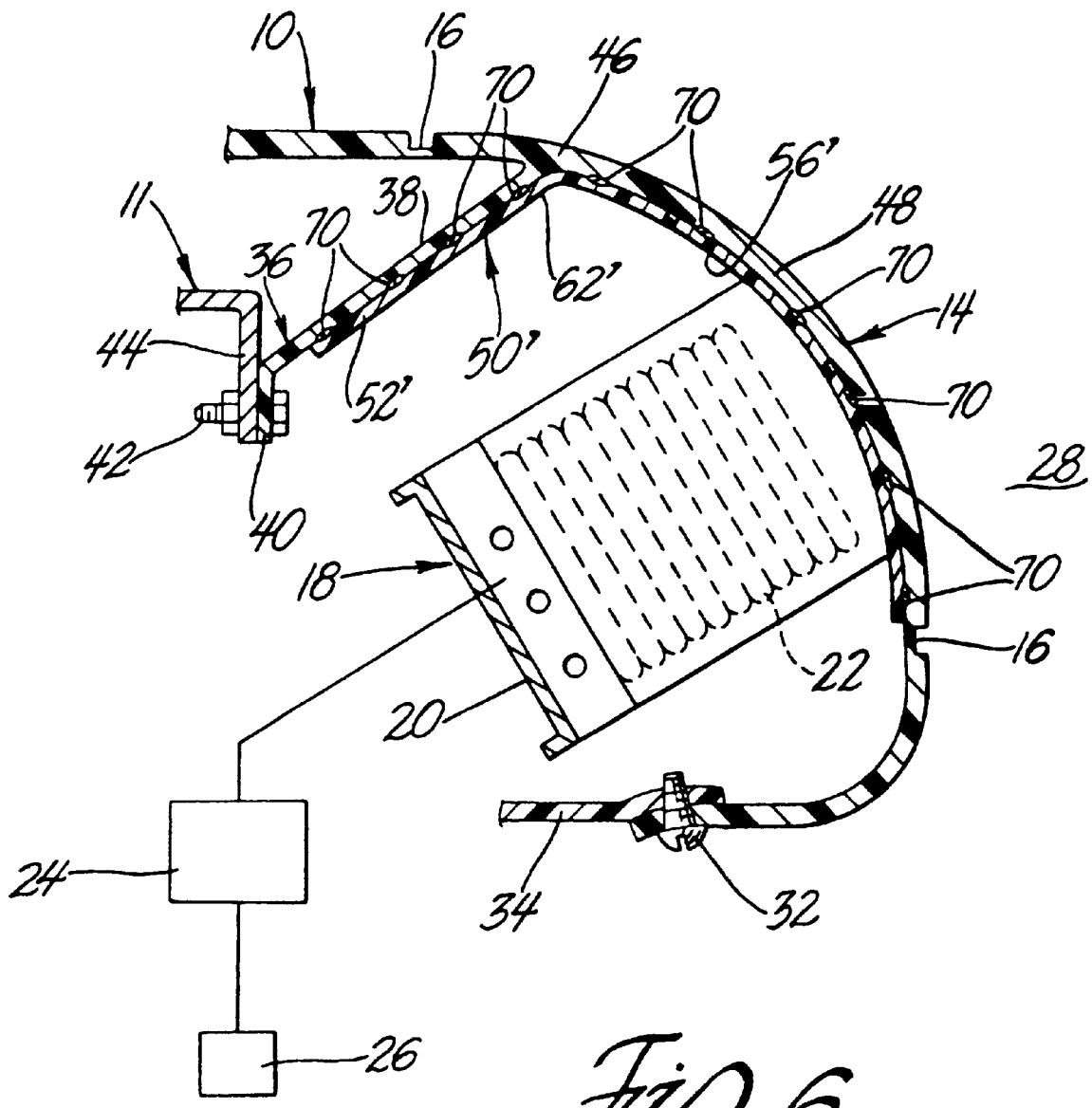
FIG. 6 is a schematic sectional view of a motor vehicle instrument panel constructed according to an alternative embodiment of the invention.

As shown in FIG. 6, the hinge 50' is a sheet-like member having a flange portion 52' that overlies a surface of the flange 36 adjacent the door 14 of the panel 10 and conforms generally to the size and shape of the flange 36 in its preferred construction. The hinge 50' can be formed from sheet stock; formed by injection molding; or formed by other well known molding techniques such as compression molding, vacuum molding or the like. The hinge 50' also has an integral door portion 56' that extends across the inner side surface of the door 14 at least to the extent that the hinge 50 does (as seen in FIG. 2) and preferably across the majority of the inner side surface so as to have the same general size and shape as the door 14, as illustrated in FIG. 6 to provide uniform flexure of the door 14. When installed, the door portion 56' of the hinge 50' is generally coextensive with the door 14 and extends across and covers the air bag 22, but does not extend across the preformed tear seam 16, as can be seen in FIG. 6, in order to retain the designed in frangibility of the tear seam 16. As with the hinge 50 of the first embodiment, the tethering hinge 50' has an integral intermediate portion 62' between the hinge and door portions 52', 56', that spans or bridges the highly stressed juncture zone 46 between the flange 36 and door 14 of the panel 10 and is provided for the same reason. The fold 63 provided in the embodiment of FIG. 2 is not required in this embodiment because the tether is more elastic than that in the first embodiment.

The preferred means and method of securing the supplemental tethering hinge 50' in position on the panel 10, according to the second embodiment, is by welding. In which the panel 10 and tethering hinge 50' are heated sufficiently at their interface at selected locations to melt and thereby fuse the two layers together at weld joints 70, illustrated schematically in FIGS. 6 and 8. One skilled in the art of welding plastics will appreciate that any of a number of known welding techniques could be employed to join the two plastic layers including, for example, welding techniques such as ultrasonic, vibration, induction, hot plate conduction, electromagnetic radiation, microwave radiation, and radio frequency welding to name a few. The selection may depend in part on availability of the equipment, economics, and suitability of the materials for the process. Whatever technique is selected, it should be one that develops a sufficient fusing of the materials strong enough to withstand the load applied to the tethering hinge 50' upon deployment of the air bag 22 so as to maintain connection with both the door 14 and the flange 36.

FIG. 7 illustrates schematically the general arrangement that may be employed for welding the hinge 50' to the panel 10. As illustrated, the tethering hinge layer 50' is positioned and held by a suitable clamping fixture 72 against the panel layer 10. The fixture 72 may be of the type having a fixed lower platen 74 against which the tethering hinge layer 50' may be placed and an upper movable platen 76 that is movable relative to the lower platen 74 into and out of engagement with the panel layer 10 to clamp and release, respectively, to the door 14 of the panel 10 and tethering hinge 50' layers. The particular configuration of the clamping fixture tooling 72 will depend, of course, on the contour and accessibility limitations imposed by the panel 10 and they also differ depending on the welding technique employed. The clamping fixture 72 may also provide access to the weld-forming tooling, shown schematically in FIG. 7 at 78 as being accessible through an opening in the lower platen 74 of the fixture 72 and movable into and out of engagement with the tethering hinge layer 50' to develop the weld joints 70. It is contemplated that one skilled in the art of welding plastics will appreciate that the disclosed clamping fixture and welding tooling is merely schematic to illustrate the general arrangement that may be utilized and that the particular configuration and arrangement of the tooling will be dictated, in part, on the configuration of the panel 10 and the welding process utilized.

The particular pattern of weld joints 70 will vary according to the requirements of the specific application. For example, FIG. 6 shows the employment of a plurality of discrete, spaced apart weld joints 70 joining the flange portion 52' of the hinge 50 to the flange 36 of the panel 10, and joining the door portion 56' to the door 14 of the panel 10. More or less welds could be utilized. For instance, all or a substantial portion of the contacting interface could be welded if required. In any case, the application of the welding should be carried out so as to not affect the appearance of the outer exposed, so-called "class A" surface of the panel that is seen by the occupant. In other words, the development of the weld joints 70 should be controlled so that when formed, they are not visibly detectable on the class A surface (e.g., there should be no melting, depressions, or other weld-induced imperfections on the class A surface).

By molding the tethering hinge 50' separately from the panel 10, it allows the panel 10 and tethering hinge 50' to be tested individually for performance before being joined and further simplifies the application of the tethering hinge material 50' to the back side of the panel 10 more particularly in applications in which the panel 10 has a complicated contour, including undercut regions which would make it difficult to mold the tethering hinge 50' in place against the panel 10.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of forming a cover assembly for concealing an inflatable air bag system of a motor vehicle, the method comprising the steps of:

forming an interior trim panel from a first plastics material, the interior trim panel having a seam at least partially defining an air bag deployment door in the panel, the first plastics material being flexible in a limited temperature range and forming an integral primary hinge about which the door of the panel may swing outwardly from the panel upon separation of a tear seam portion of the seam and outward deployment of an air bag of the supplemental passenger restraining system, the primary hinge further acting as a primary tether to retain the door of the panel within the limited temperature range but having a potentially frangible portion subject to breakage at temperatures below the limited temperature range;

forming a supplemental tethering hinge separately from the panel from a second plastics material that is relatively more flexible than the first plastics material at temperatures below the limited temperature range;

placing the supplemental tethering hinge in a position spanning the potentially frangible portion of the primary hinge with opposite margins of the supplemental tethering hinge disposed against the panel on opposite sides of the potentially frangible portion;

heating the panel and supplemental tethering hinge at their interfaces sufficiently to locally remelt the first and second plastics materials and thereby weld the supplemental tethering hinge to the panel across the potentially frangible portion of the primary hinge; and installing the panel and supplemental tethering hinge assembly on the vehicle structure with the door of the panel arranged in overlying covering relation to the air bag restraining system.

2. The method set forth in claim 1 wherein the supplemental tethering hinge is ultrasonically welded to the panel.

3. The method set forth in claim 1 wherein the supplemental tethering hinge is vibration welded to the panel.

4. The method set forth in claim 1 wherein the supplemental tethering hinge is induction welded to the panel.

5. The method set forth in claim 1 wherein the supplemental tethering hinge is hot plate conduction welded to the panel.

6. The method set forth in claim 1 wherein the supplemental tethering hinge is electromagnetically welded to the panel.

7. The method set forth in claim 1 wherein the supplemental tethering hinge is radio frequency welded to the panel.

8. The method set forth in claim 1 wherein the door portion of the supplemental tethering hinge is formed to have the same general size and shape as that of the door of the panel and is positioned to cover substantially the entire inner surface of the door.

9. A process of forming a cover assembly for concealing an inflatable air bag system of a motor vehicle, the method comprising the steps of:

forming an interior trim panel from a first plastics material, the interior trim panel having a seam at least partially defining an air bag deployment door in the panel, the first plastics material being flexible in a limited temperature range and forming an integral primary hinge about which the door of the panel may swing outwardly from the panel upon separation of a tear seam portion of the seam and outward deployment of an air bag of the supplemental passenger restraining system, the primary hinge further acting as a primary tether to retain the door of the panel within the limited temperature range but having a potentially frangible portion subject to breakage at temperatures below the limited temperature range;

forming a supplemental tethering hinge separately from the panel from a second plastics material that is relatively more flexible than the first plastics material at temperatures below the limited temperature range;

securing the supplemental tethering hinge to the panel such that an intermediate portion of the supplemental tethering hinge spans the potentially frangible portion of the primary hinge; and installing the panel and supplemental tethering hinge assemblage on the vehicle structure with the door of the panel arranged in overlying relation to the air bag restraining system.

10. The method set forth in claim 9 wherein the supplemental tethering hinge is secured to the panel at least in part by an adhesive.

11. The method set forth in claim 9 wherein the supplemental tethering hinge is formed of a second plastics material and is secured to the panel at least in part by welding.

* * * * *